(12) United States Patent
Kim et al.

(10) Patent No.: US 11,421,678 B2
(45) Date of Patent: Aug. 23, 2022

(54) PISTON PUMP FOR BRAKE SYSTEM OF VEHICLE

(71) Applicant: ERAE AMS CO., LTD, Daegu (KR)

(72) Inventors: Jin Hee Kim, Daegu (KR); Sung Jae Jung, Daegu (KR)

(73) Assignee: ERAE AMS CO., LTD, Daegu (KR)

( * ) Notice: Subject to any disclaimer, the term of this patent is extended or adjusted under 35 U.S.C. 154(b) by 93 days.

(21) Appl. No.: 16/473,726

(22) PCT Filed: Dec. 27, 2017

(86) PCT No.: PCT/KR2017/015540
§ 371 (c)(1),
(2) Date: Jun. 26, 2019

(87) PCT Pub. No.: WO2018/124727
PCT Pub. Date: Jul. 5, 2018

(65) Prior Publication Data
US 2021/0131425 A1 May 6, 2021

(30) Foreign Application Priority Data
Dec. 27, 2016 (KR) .................. 10-2016-0179918

(51) Int. Cl.
*F04B 53/14* (2006.01)
*F04B 53/18* (2006.01)
(Continued)

(52) U.S. Cl.
CPC .............. *F04B 53/14* (2013.01); *F04B 53/16* (2013.01); *F04B 53/18* (2013.01); *F04B 53/20* (2013.01);
(Continued)

(58) Field of Classification Search
CPC .......... F04B 53/14; F04B 53/16; F04B 53/18; F04B 53/20; F16K 15/042; F16K 15/044;
(Continued)

(56) References Cited

U.S. PATENT DOCUMENTS

| 6,082,244 A | 7/2000 | Siegel et al. |
| 6,217,300 B1 | 4/2001 | Schuller et al. |
| 8,414,276 B2 * | 4/2013 | Schuller ................ F04B 1/0448 417/545 |

FOREIGN PATENT DOCUMENTS

| KR | 10-2010-0092761 A | 8/2010 |
| KR | 10-2011-0016545 A | 2/2011 |

(Continued)

OTHER PUBLICATIONS

English Translation of KR-101402708-B1 (Lee) Obtained on Mar. 4, 2021 (Year: 2021).*

(Continued)

*Primary Examiner* — Connor J Tremarche
(74) *Attorney, Agent, or Firm* — Sughrue Mion, PLLC

(57) ABSTRACT

A piston pump includes: a sleeve housing which is provided with a discharge hole and defines a bore; a piston which has an inlet flow passage for drawing oil into the bore and is reciprocally movably inserted into the bore; an inlet valve which is configured to open/close the inlet flow passage; an outlet valve cover which is coupled to the sleeve housing to surround a portion at which the discharge hole is formed; an outlet valve which is configured to open/close the discharge hole; and a sealing member which is interposed between the sleeve housing and the piston to provide a sealing therebetween. The sealing member is provided with a separation prevention protrusion against which the piston is blocked to prevent a separation of the piston.

3 Claims, 3 Drawing Sheets

(51) Int. Cl.
　　　*F04B 53/16*　　　(2006.01)
　　　*F04B 53/20*　　　(2006.01)
　　　*F16K 15/04*　　　(2006.01)
　　　*F16K 27/02*　　　(2006.01)
　　　*B60T 17/02*　　　(2006.01)
(52) U.S. Cl.
　　　CPC .......... *F16K 15/042* (2013.01); *F16K 15/044* (2013.01); *F16K 27/0209* (2013.01); *B60T 17/02* (2013.01); *B60T 2270/10* (2013.01)
(58) Field of Classification Search
　　　CPC ... F16K 27/0209; B60T 17/02; B60T 2270/10
　　　See application file for complete search history.

(56) References Cited

FOREIGN PATENT DOCUMENTS

| | | |
|---|---|---|
| KR | 10-1402708 B1 | 6/2014 |
| KR | 10-1404086 B1 | 6/2014 |
| KR | 101402708 B1 * | 6/2014 |
| KR | 10-2014-0104441 A | 8/2014 |

OTHER PUBLICATIONS

International Search Report for PCT/KR2017/015540 dated Apr. 3, 2018 (PCT/ISA/210).

\* cited by examiner

[FIG. 1]
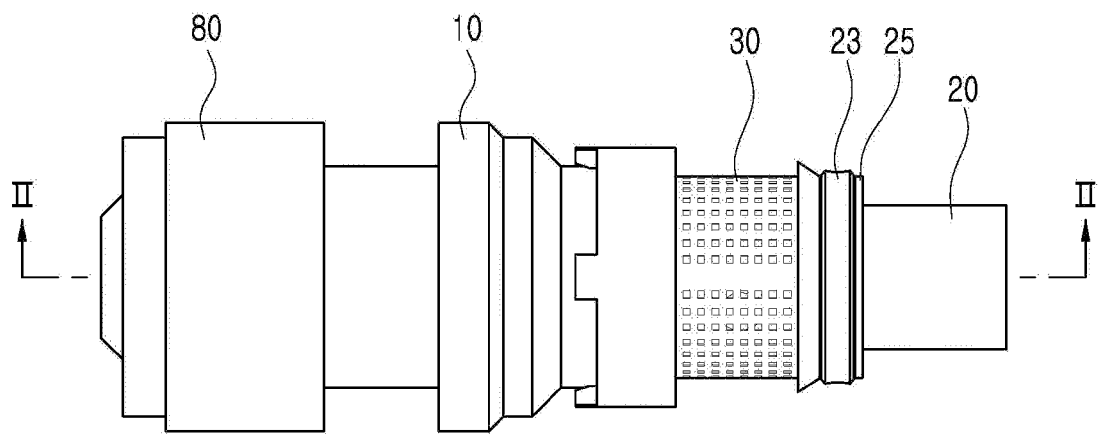

[FIG. 2]
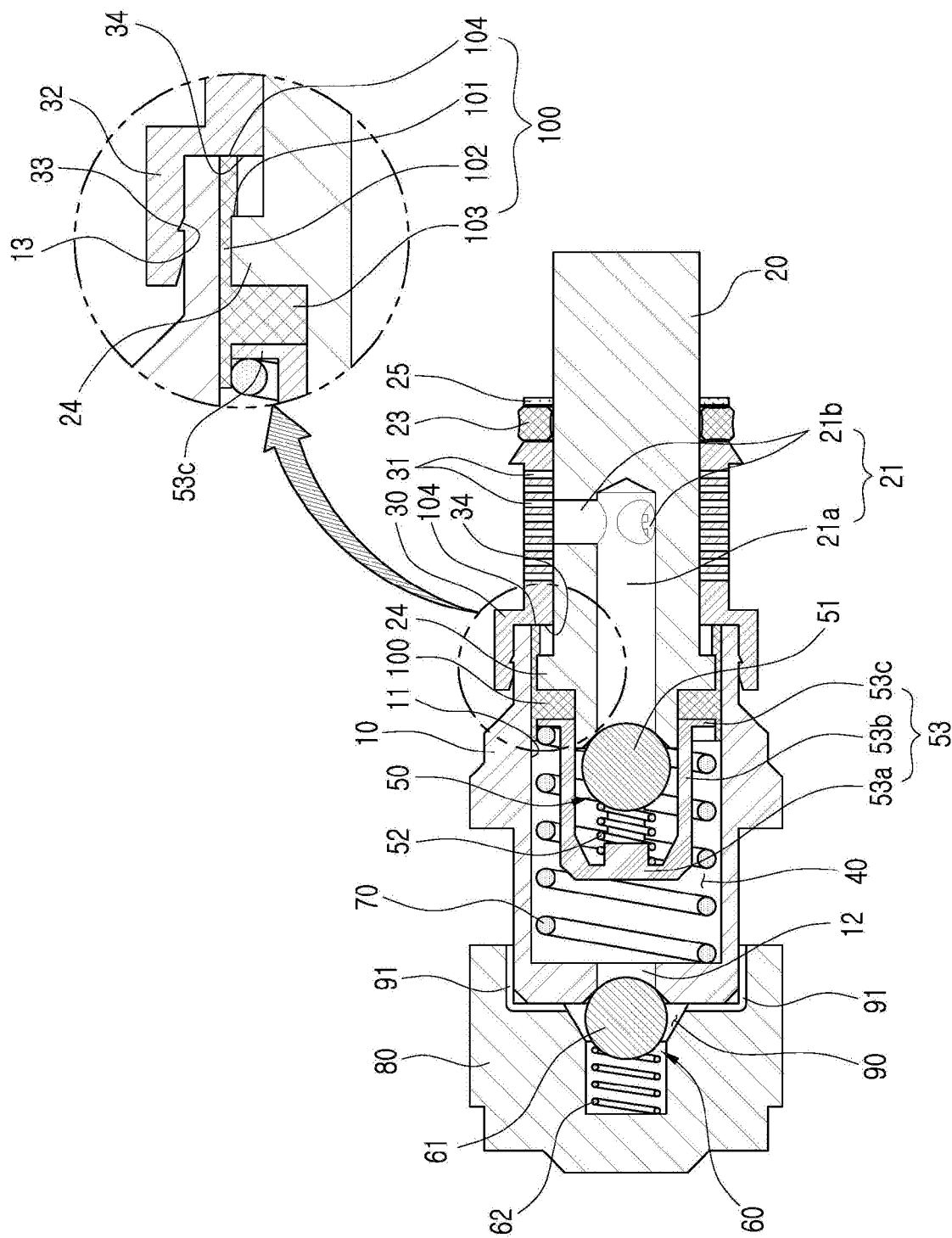

[FIG. 3]
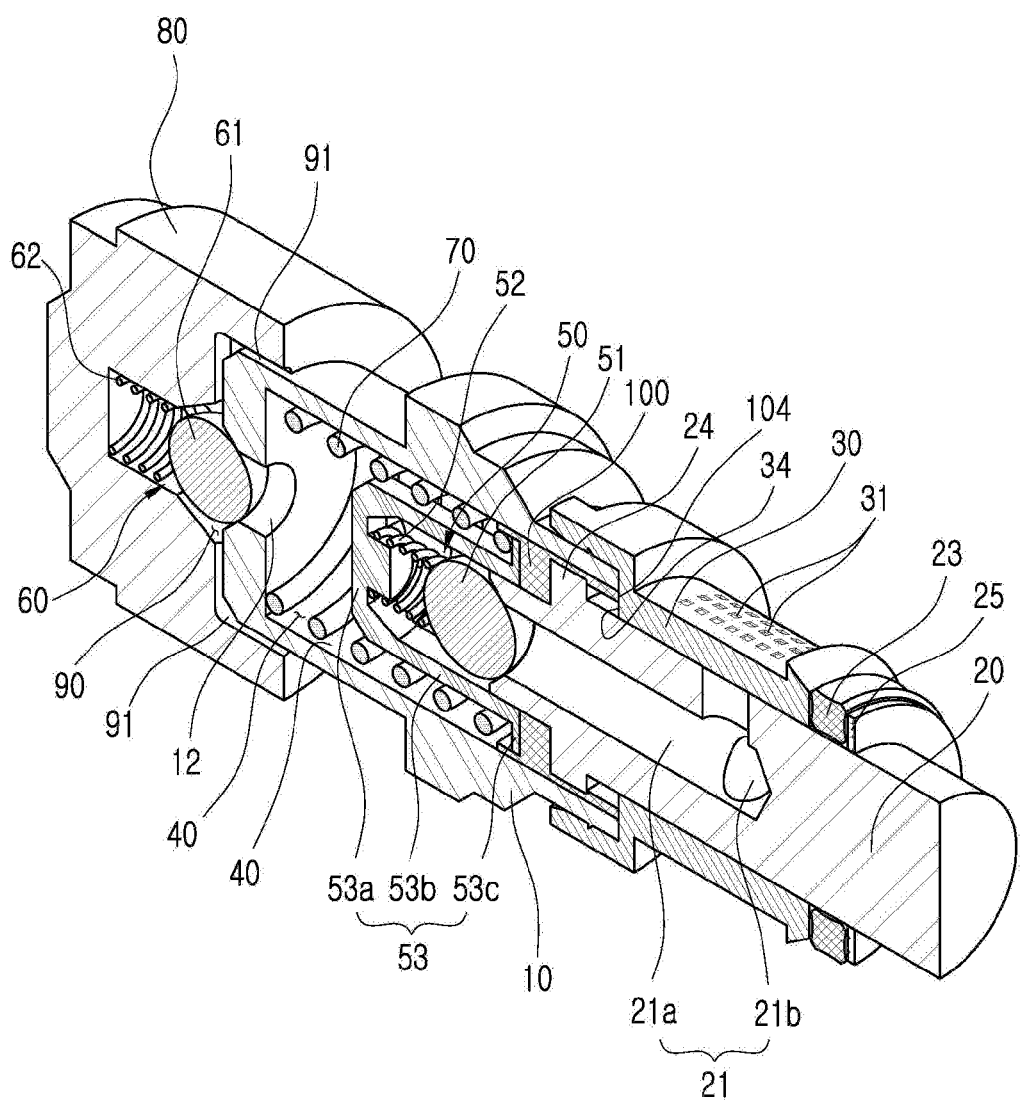

PISTON PUMP FOR BRAKE SYSTEM OF VEHICLE

CROSS REFERENCE TO RELATED APPLICATIONS

This application is a National Stage of International Application No. PCT/KR2017/015540 filed Dec. 27, 2017, claiming priority based on Korean Patent Application No. 10-2016-0179918, filed Dec. 27, 2016.

TECHNICAL FIELD

The present invention relates to a piston pump which provides hydraulic pressure used in a brake system for a stability control of a vehicle.

BACKGROUND ART

A piston pump which is used for an operation of a brake system, in particular a brake system for a stability control of a vehicle such as an anti-lock brake system (ABS) controls a hydraulic pressure in a wheel brake cylinder.

A conventional piston pump which is used in a brake system of a vehicle includes a sleeve housing and a piston which is reciprocally movably inserted into the sleeve housing, and also includes an inlet valve and an outlet valve for suction and discharging of hydraulic pressure in response to a reciprocal movement of the piston. In this regard, the piston is configured to undergo a linear reciprocal movement by a rotation of a rotating shaft which is rotated by a driving motor, and for example the piston is configured to undergo a linear reciprocal movement by an eccentric rotation of an eccentric spindle which rotates together with the rotating shaft. During an opening and a closing of the inlet valve and the outlet valve, suction and discharging of hydraulic oil are carried out by a reciprocal movement of the piston caused by the rotation of the eccentric spindle and an elastic restoring force of an elastic member.

A piston pump is installed in a modulator block in which a plurality of solenoid valves, an accumulator, a motor and so on are also installed, and for a convenient assembling a piston and a sleeve housing are previously assembled together and then are installed in the modulator block. At this time, since the piston is elastically supported by a return spring which is disposed within the sleeve housing, it is necessary to prevent the piston from being pushed out by an elastic force of the return spring in order to maintain an assembled state of the piston and the sleeve housing. For this, a method of preventing the separation of the piston using a blocking member formed on an oil filter which is assembled in the sleeve housing has been introduced.

However, in this conventional method, there is a problem in that a structure of the oil filter is complicated, and since the oil filter should have the blocking member in addition to a connection to the sleeve housing, the oil filter has a complicated structure and requires a high strength at a portion on which the blocking member is formed.

Prior document 1: U.S. Pat. No. 6,082,244 (registration date: Jul. 4, 2000)

Prior document 2: U.S. Pat. No. 6,217,300 (registration date: Aril 17, 2001)

DETAILED DESCRIPTION OF THE INVENTION

Technical Problem

An object of the present invention is to provide a piston pump which can maintain an assembled state of a sleeve housing and a piston via a simple mechanism.

Technical Solution

A piston pump according to an exemplary embodiment of the present invention includes: a sleeve housing which is provided with a discharge hole and defines a bore; a piston which has an inlet flow passage for drawing oil into the bore and is reciprocally movably inserted into the bore; an inlet valve which is configured to open/close the inlet flow passage; an outlet valve cover which is coupled to the sleeve housing to surround a portion at which the discharge hole is formed; an outlet valve which is configured to open/close the discharge hole; and a sealing member which is interposed between the sleeve housing and the piston to provide a sealing therebetween. The sealing member is provided with a separation prevention protrusion against which the piston is blocked to prevent a separation of the piston.

A blocking protrusion which is radially outwardly protruded may be formed on an outer circumferential surface of the piston, and the separation prevention protrusion may be protruded in a radially inward direction from an inner circumferential surface of the sealing member to pass by an outer edge of the blocking protrusion.

The sealing member may be supported by a return spring, which is disposed within the sleeve housing, together with the piston.

A piston pump according to another embodiment of the present invention includes: a sleeve housing which is provided with a discharge hole and defines a bore; a piston which has an inlet flow passage for drawing oil into the bore and is reciprocally movably inserted into the bore; an inlet valve which is configured to open/close the inlet flow passage; an outlet valve cover which is coupled to the sleeve housing to surround a portion at which the discharge hole is formed; an outlet valve which is configured to open/close the discharge hole; an oil filter which is coupled to the sleeve housing; and a sealing member which is interposed between the sleeve housing and the piston to provide a sealing therebetween. The sealing member is supported against the oil filter so as not to be separated from the sleeve housing, and the sealing member is provided with a separation prevention protrusion against which the piston is blocked to prevent a separation of the piston.

A blocking protrusion which is radially outwardly protruded may be formed on an outer circumferential surface of the piston, and the separation prevention protrusion may be protruded in a radially inward direction from an inner circumferential surface of the sealing member to pass by an outer edge of the blocking protrusion.

The oil filter may be provided with a supporting surface, and a frontal end of the sealing member may be supported against the supporting surface so that the sealing member is prevented from being separated from the sleeve housing.

A piston pump according to yet another embodiment of the present invention includes: a sleeve housing which is provided with a discharge hole and defines a bore; a piston which has an inlet flow passage for drawing oil into the bore and is reciprocally movably inserted into the bore; an inlet valve which is configured to open/close the inlet flow passage; an outlet valve cover which is coupled to the sleeve housing to surround a portion at which the discharge hole is formed; an outlet valve which is configured to open/close the discharge hole; and a sealing member which is interposed between the sleeve housing and the piston to provide a sealing therebetween. The sealing member is installed so as to be prevented from being separated from the sleeve housing, and the piston is supported against the sealing member to be prevented from being separated from the sleeve housing.

The sealing member may be provided with a separation prevention protrusion which is protruded in a radially inward direction, and the piston may be blocked against the separation prevention protrusion so as to be prevented from being separated from the sleeve housing.

The piston pump may further include an oil filter which is connected to the sleeve housing, and the sealing member may be supported against a supporting surface formed in the oil filter so as to be prevented from being separated from the sleeve housing.

Effects of the Invention

According to the present invention, since the piston can be pre-assembled to the separation prevention protrusion of the sealing member so as to be prevented from being separated, the piston can be prevented from being separated by a simple change of a shape of the sealing member without a separate member.

BRIEF DESCRIPTION OF THE DRAWINGS

FIG. 1 is a side elevational view of a piston pump according to an embodiment of the present invention.

FIG. 2 is a sectional view taken along a line II-II in FIG. 1.

FIG. 3 is a sectional perspective view taken along a line II-II in FIG. 1.

DETAILED DESCRIPTION OF THE EMBODIMENTS

Embodiments of the present invention will be described in detail hereinafter with reference to the accompanying drawings.

A piston pump according to an embodiment of the present invention can be used as a part of an apparatus for regulating oil pressure for an operation of a brake system of a vehicle, and may play a role of receiving hydraulic oil discharged from a master cylinder of a vehicle and transmitting hydraulic oil to a wheel cylinder. An apparatus for regulating oil pressure may include a plurality of solenoid valves, an accumulator, a motor or the like in addition to the piston pump according to an embodiment of the present invention, and the piston pump, the solenoid valves, the accumulator, the motor and so on may be disposed in a modulator block.

The piston pump according to an embodiment of the present invention may be disposed within a bore formed in the modulator block. At this time, an inlet port and an outlet port through which hydraulic oil can be supplied and discharged may be formed, and hydraulic oil supplied through the inlet port passes through the piston pump according to an embodiment of the present invention and is then discharged through the outlet port.

Referring to FIG. 1 to FIG. 3, a sleeve housing 10 and a piston 20 are provided.

The sleeve housing 10 is provided with a bore 11. At this time, one side of the sleeve housing 10 is opened and a discharge hole 12 through which oil is discharged is formed at the other side thereof.

The piston 20 is reciprocally movably inserted into the bore 11 of the sleeve housing 10. In detail, the piston 20 is reciprocally movably disposed in a state that a frontal end portion thereof is inserted into the bore 11. As shown in FIG. 2 and FIG. 3, a side of the sleeve housing 10 which is opposite to a side in which the discharge hole 12 is formed is opened, and a frontal end portion of the piston 20 is inserted into the bore 11 through the open space of the sleeve housing 10. At this time, not shown in the drawings, the piston 20 is disposed such that an end thereof opposite to an end inserted into the bore 11 of the sleeve housing 10 contacts an eccentric spindle which is driven by a motor (not shown), and a movement of the piston 20 thereby occurs by a rotation of the eccentric spindle. In addition, a return spring 70 which elastically supports the piston 20 against the sleeve housing 10 is provided. The piston 20 is pushed toward the discharge hole 12 from a position shown in FIG. 2 and FIG. 3 by the eccentric spindle and returns to a position shown in FIG. 2 and FIG. 3 by the return spring 70. That is, the reciprocal movement of the piston 20 occurs by the rotation of the eccentric spindle and the elastic restoring force of the return spring 70.

As shown in FIG. 2 and FIG. 3, a sealing member 100 for sealing between the piston 20 and the sleeve housing 10 may be provided. The sealing member 100 may be supported against the piston 20 by the coil spring 70 together with a retainer 53 of an inlet valve 50 which will be described later. The sealing member 100 may be inserted into the sleeve housing 10 and may approximately have a shape of a hollow cylinder perforated in a longitudinal direction.

Meanwhile, a seal 23 for sealing between the piston 20 and a portion at which the eccentric spindle is disposed may be provided. As shown in the drawings, the seal 23 may be supported by a support member 25, and the seal 23 and the support member 25 may respectively have a ring shape.

An inlet flow passage 21 for inflow of an oil is formed in the piston 20. As shown in the drawings, the inlet flow passage 21 may consist of a radial flow passage 21*b* which is elongated in a radially inward direction from an outer circumferential surface of the piston 20 and a longitudinal flow passage 21*a* which is elongated in a longitudinal direction of the piston 20, and the radial flow passage 21*b* may be provided with a plurality. An inner end of the radial flow passage 21*b* is communicated with the longitudinal flow passage 21*a*. At this time, an oil filter 30 may be provided at a position at which the radial flow passage 21*b* is formed. The oil filter 30 may have a plurality of minute apertures 31, and oil in the inlet port (not shown) formed in the modulator block (not shown) is drawn into the radial flow passage 21*b* after passing the oil filter 30.

The oil filter 30 may be coupled to the sleeve housing 10 so as not to be separated therefrom. For example, a coupling portion 32 which is formed to enclose an end portion of the sleeve housing 10 from the outside may be formed at an end portion of the oil filter 30, and a coupling groove 33 which is formed at an inner circumferential surface of the coupling portion 32 may be coupled to a coupling protrusion 13 which is formed at an outer circumferential surface of the sleeve housing 10. While the coupling portion 32 is slightly deformed, the sleeve housing 10 is inserted into the coupling portion 32 so that the coupling protrusion 13 can be coupled to the coupling groove 33.

A space between the sleeve housing 10 and the piston 20 acts as a compression chamber 40. That is, a space between the sleeve housing 10 and the piston 20 becomes the compression chamber 40 for compressing oil, and oil is drawn into the compression chamber 40 via the inlet flow passage 21 of the piston 20 and is discharged from the compression chamber 40 via the discharge hole 12.

An inlet valve 50 for regulating oil inlet into the compression chamber 40 and an outlet valve 60 for regulating oil outlet from the compression chamber 40 are respectively provided. The inlet valve 50 selectively opens/closes the inlet flow passage 21 of the piston 20 to regulate oil inlet, and the outlet valve 60 selectively opens/closes the discharge hole 12 of the sleeve housing 10 to regulate oil outlet.

The inlet valve 50 may be realized as a ball-poppet valve. For example, as shown in FIG. 2 and FIG. 3, the inlet valve 50 may include a ball 51 which opens or closes the inlet flow passage 21, a coil spring 52 which elastically supports the ball 51 and a retainer 53 which supports the coil spring 52. The retainer 53 may include a body portion 53a which supports the coil spring 52 and a plurality of legs 53b which are respectively elongated from an outer end of the body portion 53a. At this time, supporting portions 53c which are respectively elongated from ends of the legs 53b in a radially outward direction may be provided. The retainer 53 is elastically supported by the coil spring 70 together with the sealing member 100 and the piston 20.

When the ball 51 of the inlet valve 50 is located at a position shown in FIG. 2 and FIG. 3, the inlet flow passage 21 is closed. Meanwhile, if the piston 20 moves toward the discharge hole 12 from the state shown in FIG. 2 and FIG. 3, the inlet valve 50 also moves toward the discharge hole 12 with the compression of the coil spring 70, and if the eccentric spindle subsequently further rotates so that a force to push the piston 20 is removed, the piston 20 returns to the position of FIG. 2 and FIG. 3 by the restoring force of the return spring 70 and during this process the return of the ball 51 progresses later than the return of the piston 20 so that the ball 51 is instantaneously spaced from the piston 20 so that the inlet flow passage 21 is opened. In the meantime, oil in the compression chamber 40 is compressed during the movement of the piston 20 toward the discharge hole 12 so as to be discharged through the discharge hole 12, and oil is drawn into the compression chamber 40 through the inlet flow passage 21 while the ball 51 is spaced from the piston 20.

The outlet valve 60 selectively opens/closes the discharge hole 12 so as to regulate oil discharge through the discharge hole 12.

The outlet valve 60 may be realized as a ball-poppet valve. For example, as shown in FIG. 2 and FIG. 3, the outlet valve 60 may include a ball 61 which selectively opens/closes the discharge hole 12 and a coil spring 62 which elastically supports the ball 61. At this time, a cover 80 for securing a space for an installation of the outlet valve 60 is connected to the sleeve housing 10. The cover 80 is, as shown in FIG. 2 and FIG. 3, connected to the sleeve housing 10 to surround a portion at which the discharge hole 12 is formed. Accordingly, a space between the sleeve housing 10 and the cover 80 is formed, and the outlet valve 60 is disposed in the space between the sleeve housing 10 and the cover 80.

A discharge chamber 90 in which oil is contained is formed between the sleeve housing 10 and the cover 80. Oil discharged through the discharge hole 12 passes through the discharge chamber 90 and is subsequently discharged through an outlet port formed in the modulator block (not shown). At this time, an oil discharge passage 91 for discharging oil in the discharge chamber 90 to the outlet port (not shown) is formed. For example, the oil discharge passage 91 may be realized as a groove which is formed on an inner surface of the cover 80.

FIG. 2 and FIG. 3 show a state in which the ball 61 of the outlet valve 60 closes the discharge hole 12, and if a pressure in the compression chamber 40 increases from the state of FIG. 2 and FIG. 3, the ball 61 is pushed away so as to be spaced from the sleeve housing 10 so that the discharge hole 12 is opened.

According to an embodiment of the present invention, the sealing member 100 provides a function preventing the separation of the piston 20, and detailed description will be made hereinafter with reference to FIG. 2 and FIG. 3.

The sealing member 100 is installed so as not to be separated from the sleeve housing 10, and the piston 10 is blocked by the sealing member 100 to be prevented from being separated from the sleeve housing 10. At this time, the sealing member 100 can be prevented from being separated from the sleeve housing 10 by being supported by the oil filter 30 which is coupled to the sleeve housing 10. Hereinafter a structure for preventing the separation of the piston 10 will be described.

The sealing member 100 has a separation prevention protrusion 101 which is configured to block the piston 20 to prevent the separation of the piston 20. For example, as shown in FIG. 2 and FIG. 3, the sealing member 100 may be elongated in a longitudinal direction of the piston 20, and the separation prevent protrusion 101 may be formed by being protruded in a radially inward direction from an inner circumferential surface of a sealing portion 102 which contacts an inner circumferential surface of the sleeve housing 10. Meanwhile, the sealing member 100 may include a supporting portion 103 which is elongated in a radially inward direction from an inner circumferential surface of the sealing portion 102, and the supporting portion 103 is interposed between a supporting portion 53c of the retainer 53 of the inlet valve 50 and a blocking protrusion 24 which is formed on an outer circumferential surface of the piston 20. Since the supporting portion 53c is supported by the return spring 70, the supporting portion 103 contacting this is also supported by the return spring 70.

Since the blocking protrusion 24 which is radially outwardly protruded is formed on an outer circumferential surface of the piston 20 and the separation prevention protrusion 101 of the sealing member 100 supports the blocking protrusion 24, the separation (in upper direction in FIG. 2) of the piston 20 can be prevented. For this, as shown in FIG. 2, the separation prevention protrusion 101 is protruded in a radially inward direction from an inner circumferential surface of the sealing portion 102 of the sealing member 100 to pass by an outer edge of the blocking protrusion 24.

Here the sealing member 100 may be supported by the oil filter 30 so as to be prevented from being separated from the sleeve housing 10. For example, a frontal end 104 of the sealing portion 102 may be blocked against a supporting surface 34 of the oil filter 30. As shown in FIG. 2 and FIG. 3, the supporting surface 34 may be formed to face the frontal end 104 of the sealing member 100 and may be approximately perpendicular to a longitudinal axis of the piston pump.

Accordingly, the retainer 53c of the inlet valve 50, the sealing member 100 and the piston 20 are pushed by the returned spring 70 together, and the sealing portion 102 of the sealing member 100 collides with the oil filter 30, so that the piston 20 can be prevented from being separated from the sleeve housing 10.

According to an embodiment of the present invention, since the structure for preventing the separation of the piston 20 is realized by the sealing member 100 and the blocking protrusion 24 formed on an outer circumferential surface of the piston 20, the separation prevention structure is very simple. Furthermore, since the sealing portion 102 of the sealing member 100 contacts the oil filter 30, the sealing effect can be enhanced.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

INDUSTRIAL APPLICABILITY

The present invention relates to a piston pump used in a brake system of a vehicle, so it has an industrial applicability.

The invention claimed is:

1. A piston pump comprising:
a sleeve housing which is provided with a discharge hole and defines a bore;
a piston which has an inlet flow passage for drawing oil into the bore and is reciprocally movably inserted into the bore;
an inlet valve which is configured to open and close the inlet flow passage;
an outlet valve cover which is coupled to the sleeve housing to surround a portion at which the discharge hole is formed;
an outlet valve which is configured to open and close the discharge hole;
an oil filter which is coupled to the sleeve housing; and
a sealing member which is interposed between the sleeve housing and the piston to provide a sealing therebetween,
wherein the inlet valve comprises a ball configured to open and close the inlet flow passage, a retainer receiving the ball, a coil spring elastically supporting the ball against the retainer, and a return spring elastically supporting the retainer against the sleeve housing,
wherein the sealing member comprises:
a sealing portion interposed between the sleeve housing and the piston, a frontal end of the sealing portion being supported directly against the oil filter so as not to be separated from the sleeve housing;
a supporting portion elongated in a radially inward direction from an inner circumferential surface of the sealing portion and interposed between an end of the retainer and a blocking protrusion which is formed on an outer circumferential surface of the piston, so that the blocking protrusion is elastically supported by the return spring via the supporting portion and the retainer in one direction of a reciprocal movement of the piston and is supported by the separation prevention protrusion in the other direction of the reciprocal movement of the piston; and
a separation prevention protrusion protruded in a radially inward direction from an inner circumferential surface of the sealing portion, the blocking protrusion being interposed between the supporting portion and the separation prevention protrusion so that the piston is blocked to be prevented from being separated from the sleeve housing.

2. The piston pump of claim 1, wherein the blocking protrusion is radially outwardly protruded from the outer circumferential surface of the piston, and
wherein the separation prevention protrusion is protruded in the radially inward direction from the inner circumferential surface of the sealing member to block an outer edge of the blocking protrusion.

3. The piston pump of claim 1, wherein the oil filter is provided with a supporting surface, and
wherein a frontal end of the sealing member is supported against the supporting surface so that the sealing member is prevented from being separated from the sleeve housing.

* * * * *